June 5, 1945.  F. D. CAMPBELL  2,377,400
TRANSMISSION FOR VEHICLES
Filed Feb. 23, 1942  4 Sheets-Sheet 2
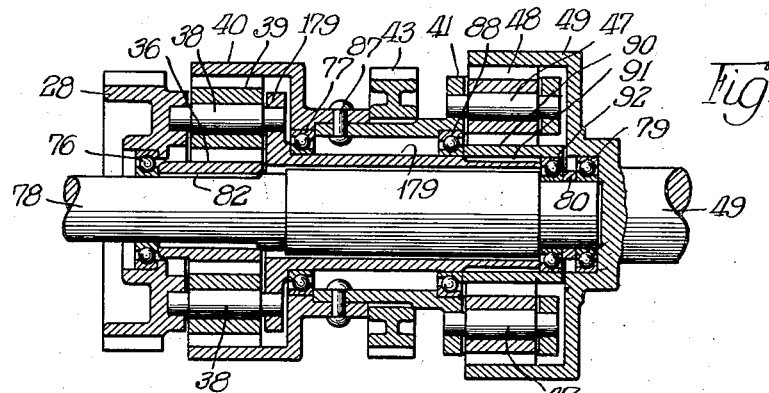
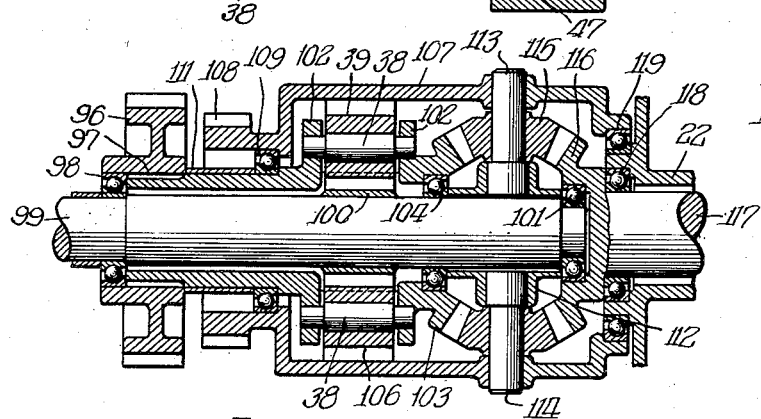
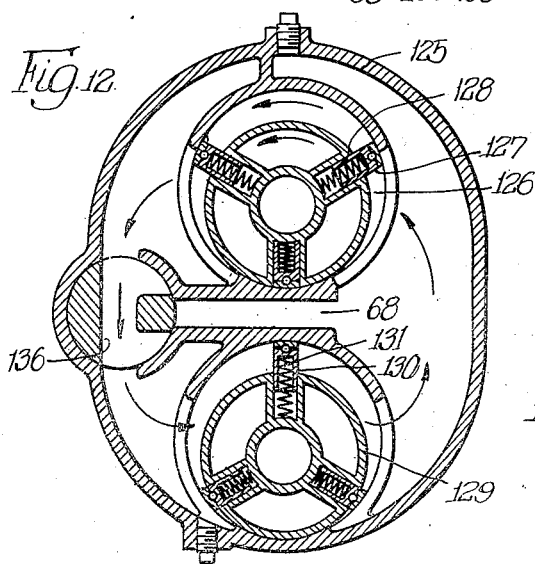
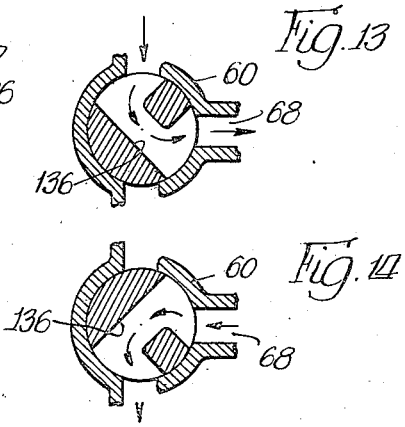
INVENTOR.
Frank D Campbell,
BY
ATTORNEY.

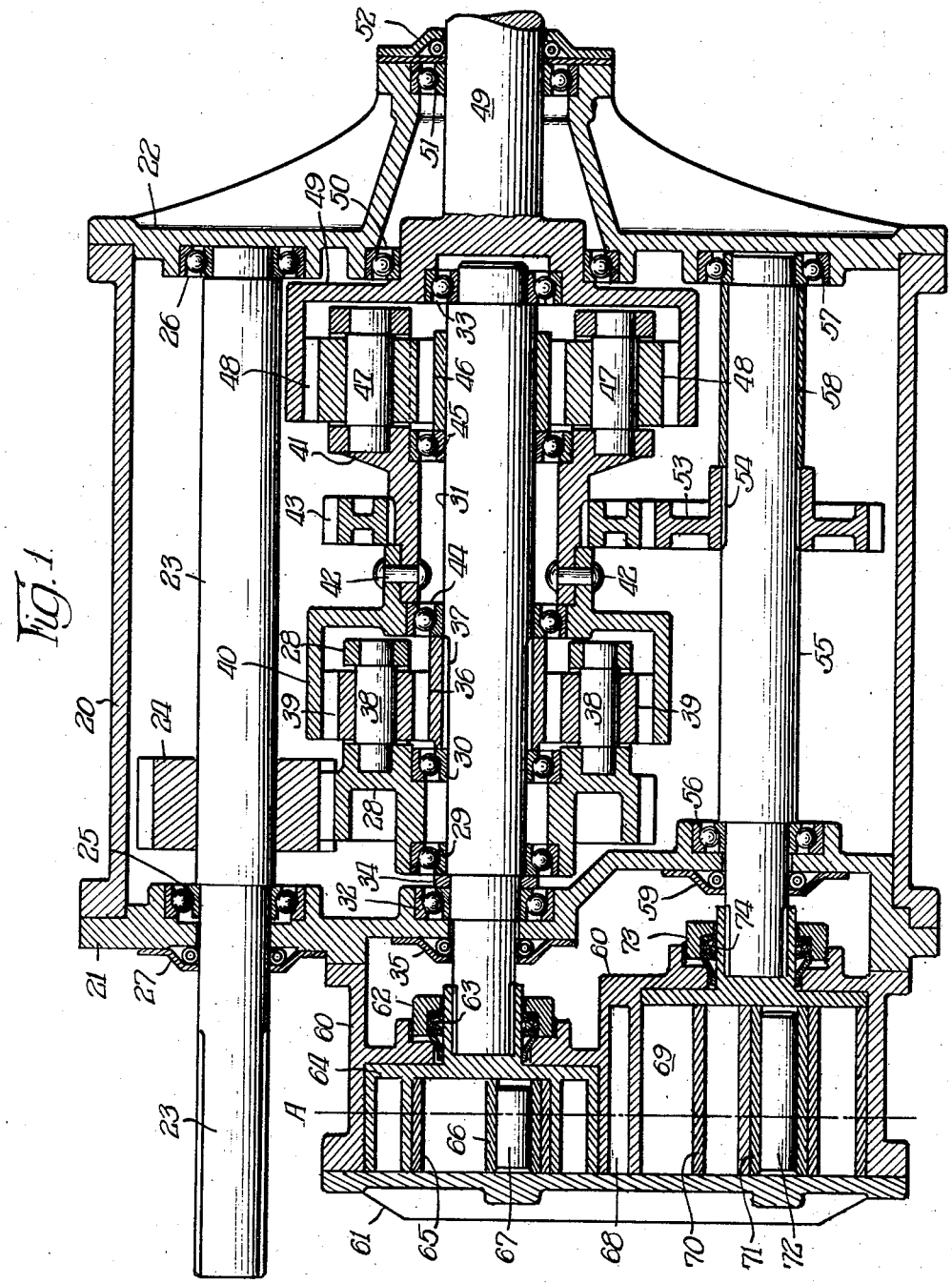

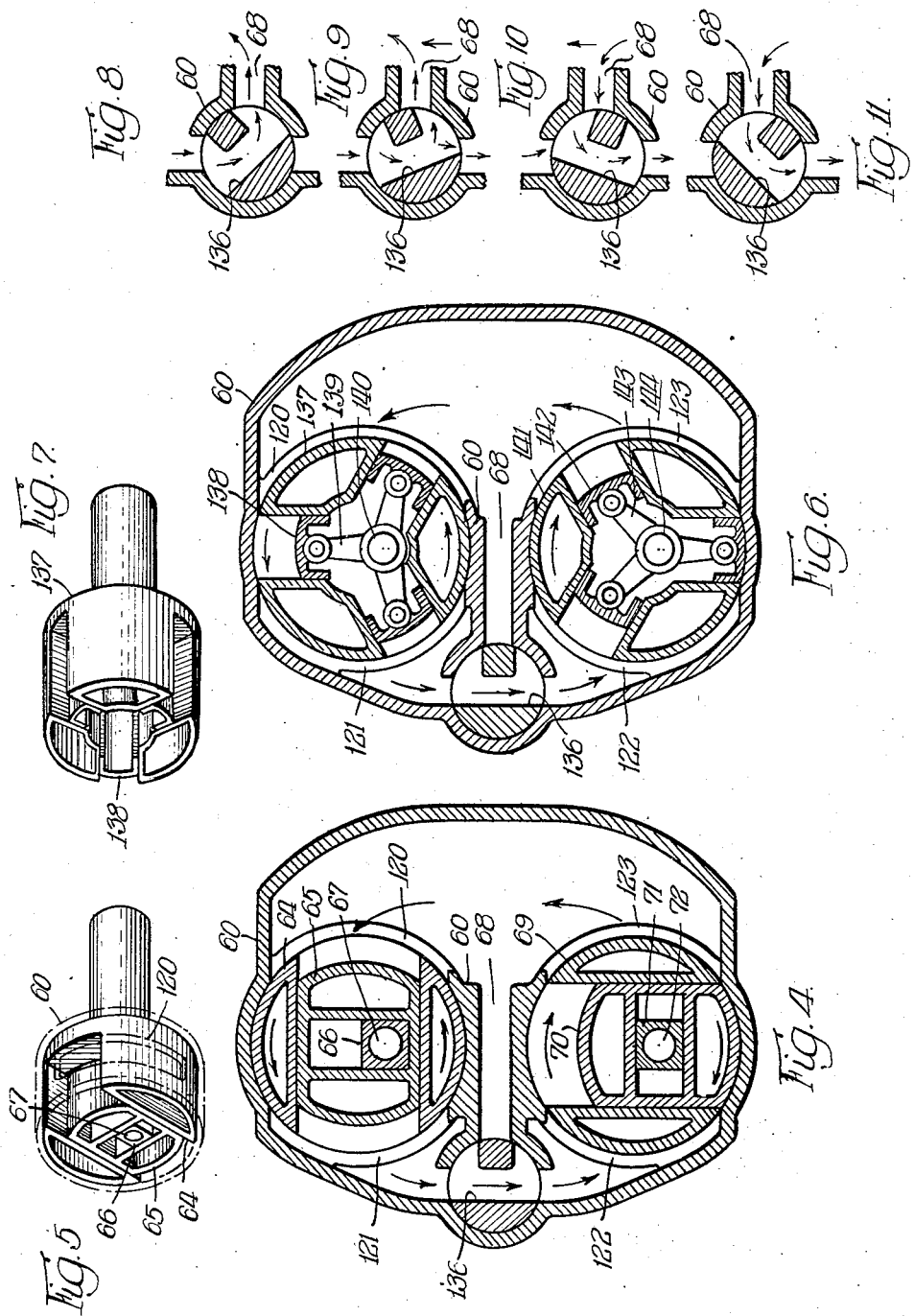

June 5, 1945.　　　F. D. CAMPBELL　　　2,377,400
TRANSMISSION FOR VEHICLES
Filed Feb. 23, 1942　　　4 Sheets-Sheet 4
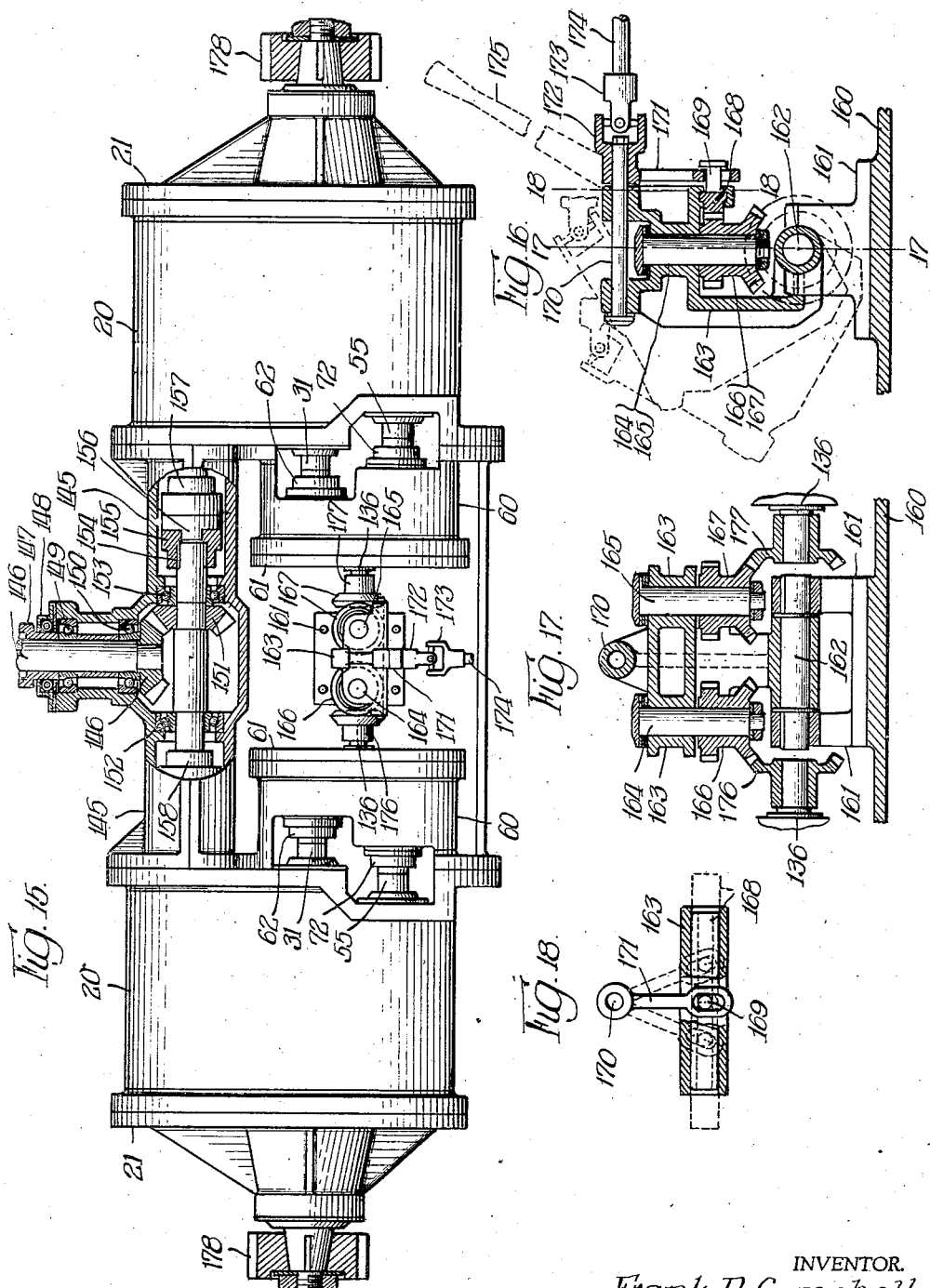
INVENTOR.
Frank D. Campbell,
BY
ATTORNEY.

Patented June 5, 1945

2,377,400

UNITED STATES PATENT OFFICE 2,377,400

TRANSMISSION FOR VEHICLES

Frank D. Campbell, Chicago, Ill.

Application February 23, 1942, Serial No. 431,920

16 Claims. (Cl. 74—293)

This invention is directed to transmissions intended primarily for such vehicular and mechanical use as a transmission for an automobile, truck, an army tank, caterpillar tractor, excavating equipment, vehicles driven by either Diesel or other types of combustion engines, hoists, cranes, etc. This application is a continuation, in part, of the subject matter of my prior application, on "Transmission and the like," Serial No. 316,471, filed January 31, 1940.

Applicant provides a transmission which overcomes objectionable features of prior transmissions; uses hydraulic means to control the gear train from the power means whereby applicant secures in his construction reversibility, variability from zero speed on the output shaft of the transmission to a speed which is equal to or greater than the input speed. In this connection this invention is particularly adaptable for use where a variable speed transmission is desired with range from zero output revolutions on the output shaft of the transmission to full direct speed and additional over drive up to the limit of the geared-up planetary unit output, in both forward and reverse directions, and to provide infinite variability in the full range of speeds in both forward and reverse.

One particular advantage, an object of the present invention, is that it is a transmission wherein the torque transmitting elements are of planetary or differential gear forms, and wherein the variability of the speed of the output shaft is secured by hydraulic controls or governors.

It is an object in this connection to provide a transmission, internal control of which is hydraulic, the hydraulic control being in turn regulated by a multi-port valve having a simple operational movement of about 90 degrees to control all functions of the transmission from maximum speed forward to maximum speed in reverse.

It is further an object to provide a form of transmission wherein the arrangement of the gear elements results in an output speed in a reverse direction, equal to or greater than, the input speed.

It is an object to provide a transmission of an hydraulically controlled type in which one hydraulic governor may restrict flow or fluid thru it, produce resistance to counter torque on the output shaft, to maintain any desired speed with the vehicle in descent on a grade, or to decelerate or decrease speed of the vehicle, or to bring the vehicle to a point of immobility.

A further object is a transmission having two sets of planetary gears, and two hydraulic governors, each governor controlling two coupled gear elements, one element in each set, wherein the action and speed of the two governors are inversely proportionate to each other, thus in the complete function of control from maximum forward to maximum reverse speed with the primary governor at rest and the secondary governor at maximum speed, maximum forward speed will be obtained, and inversely, with the secondary governor at rest and the primary governor at maximum speed, the maximum reverse speed will be obtained, while the neutral point in the transmission will be established by the correlative action of the two planetary gear sets to produce zero R. P. M. in the output shaft.

It is an object of this invention to provide a transmission in which there is to be no reverse direction in either of the two hydraulic governors, or in direction of flow of hydraulic fluid, reverse direction being confined to planet pinions and output shaft when in reverse speed.

It is further an object to provide a transmission having two correlative gear sets, and two hydraulic governors with a multi-port control valve, which at the established neutral point in the valve setting will maintain the vehicle immobile, either in the presence or absence of torsional stress, in either direction on the output shaft.

It is an object to provide in a variable transmission, a control arrangement, wherein both a primary and a secondary hydraulic governor, a multi-port control valve, a bypass port, and a fluid reservoir, may be contained in a single casting or housing with access cover, thus precluding the use of exterior piping, fittings, and attachments, and confining the full control of the hydraulic governors to a simple and comparatively inexpensive form and disposition of the elements of the control method.

It is a further object to provide a combination of two transmission units of the type previously described, driving parallel in either forward or reverse directions or acting in differential relation to each other, and having the quality of infinite variability in both parallel and differential driving action. This is particularly applicable to caterpillar vehicles, for obtaining variable forward or reverse speeds of both caterpillar treads simultaneously or alternately as in moving forward, backward, turning or pivoting.

It is also an object to provide a form of control for two transmission units, arranged differentially in parallel, as applied to caterpillar vehicles, whereby a single actuating mechanism operating substantially in a universal movement, will permit an operator to fully direct and control a caterpillar vehicle with one hand.

It is another object to provide a transmission which, in its design and construction, possesses simplicity, strength, accessibility, is capable of being manufactured at moderate cost, and does not require periodic adjustments, nor have any of its functions critically impaired by wear.

Other objects and advantages of the invention will appear as the nature of the improvements is better understood, the invention consisting substantially in the novel construction, combination and arrangement of parts hereinafter fully described, illustrated in the accompanying drawings, and finally pointed out in the appended claims.

In the drawings:

Figure 1 is a side elevational view in cross section, substantially on a vertical plane thru the center of the device forming the subject matter of this invention, the power means not being shown. This is the preferred embodiment of this invention;

Figure 2 is a side elevational view in cross section substantially on a vertical plane thru the center of the two planetary gear sets in an alternate arrangement of the coupled elements of the gear sets;

Figure 3 is a side elevational view in cross section on a vertical plane thru the center of two gear sets in an alternate arrangement of one planetary and one differential gear set;

Figure 4 is an elevational sectional view on a vertical plane forming an arrangement of rotor and double action single piston type of primary and secondary hydraulic governors, three port control valve and case. The control valve is shown in position to permit maximum passage of fluid thru both governors.

Figure 5 is a perspective view of either hydraulic governor, in Figure 1, illustrating the nature of the rotor, piston and port.

Figure 6 is an elevational sectional view on a vertical plane of an arrangement of rotor and radially set piston type of primary and secondary hydraulic governor with 3 port control valve and case. The control valve is shown in position to permit maximum passage of fluid thru both governors.

Figure 7 is a perspective view of either hydraulic governor in Figure 6, illustrating the nature of the rotor and pistons.

Figure 8 is an elevational sectional view on a vertical plane, of the control valve. It shows the valve in position for the primary governor to receive maximum flow of fluid while the secondary governor is held stationary providing maximum reverse speed in the transmission;

Figure 9 is a view similar to Figure 8 but showing the control valve in position to permit partial passage of fluid to the secondary governor but in a lesser quantity than to the primary governor illustrating the transition from maximum reverse speed to the neutral;

Figure 10 is a view similar to Figure 8 but showing the control valve in position to permit passage of fluid to the primary governor, but in a lesser quantity than to the secondary governor, illustrating transition toward overdrive forward speed;

Figure 11 is a view similar to Figure 8 but showing the control valve in position for the secondary governor to receive a maximum flow of fluid while the primary governor is held stationary illustrating the position of the valve at the maximum forward speed.

Figure 12 is an end elevational cross sectional view substantially on a vertical plane illustrating an arrangement of rotary vane type of primary and secondary hydraulic governors, three port control valve and case. The control valve is shown in position for maximum passage of fluid thru both governors;

Figure 13 is an elevational sectional view of the control valve shown in position to permit maximum speed of primary hydraulic governor and to hold secondary hydraulic governor practically at rest for maximum speed in reverse;

Figure 14 is an elevational sectional view of the control valve shown in position as opposed to Figure 5, to permit maximum speed of secondary hydraulic governor, and to hold primary hydraulic governor practically at rest for maximum speed forward;

Figure 15 is a plan view with the interior partially in section substantially along a horizontal plane, forming an arrangement of two transmission units opposed, with a common propeller shaft geared to both units, with single control means to the control valves of both transmission units whereby both transmission units may be simultaneously operated at maximum forward or reverse speed, one transmission unit may be operated either faster or slower than the other in either forward or reverse speed, or either transmission unit may be operated in any degree of forward speed while the other is operated in any degree of reverse speed up to maximum forward speed on one unit simultaneously with maximum reverse speed on the other;

Figure 16 is an end elevational sectional view of the control mechanism on a vertical plane thru the center of the device, forming an arrangement of frame, spur gear, gear rack, and mitre gears and illustrating the arc of movement to provide parallel control of both transmission units from maximum forward to maximum reverse speed;

Figure 17 is a side elevational sectional view of the control mechanism on a vertical plane on the line 17—17 in Figure 16, illustrating the arrangement of frame and gears to connect the control valves on the transmission units; and Figure 18 is an elevational view of part of the control mechanism, shown on the line 18—18 in Figure 16, forming an arrangement of lever and gear rack and illustrating the movement of rack and gears to provide a differential action of the gears simultaneously with the paralleling movement shown in Figure 16 to secure a universal control movement in a single action as described under Figure 15.

*Description of Figure 1*

Referring in detail to the construction shown in the various figures, and referring first to Figure 1, I have provided the gear case 20, which, in its entirety, constitutes the housing for the device herein described. The gear case 20 is provided with removable portions to allow necessary accessibility for service and assembly of the transmission mechanism. In this illustration the removable portions are shown as the front end plate 21 and the rear end plate 22.

I have provided an input shaft 23, adapted to be connected to a source of power (not shown) such as, for example, a gasoline engine. Shaft 23 carries the driving pinion 24 which is preferably made integral with said shaft. The input shaft 23 is journaled in the bearings 25 (front bearings) and 26 (rear bearings), and at the front end where it passes through the end plate 21 of the gear case, the input shaft 23 is provided with a grease seal 27. The shaft 23 has means retaining the shaft against endwise movement, a convenient means being shown in Figure 1 as the shoulders seating against the bearings 25 and 26.

The driving pinion 24 meshes with the driven spur gear 28 (hereinafter usually referred to as "first spur gear" for convenience), which first spur gear 28 is journaled on bearings 29 and 30, and which first spur gear has, as an integral part thereof in the arrangement illustrated, the planet gear carrier.

The floating or sun gear shaft 31, carries the sun gears and drives the primary hydraulic governor 64, as herein later described. The floating shaft 31 preferably is journaled in bearings 32 and 33, the bearing 32 being the front bearing and separated from the bearing 29 by the conventional spacer 34. The grease seal 35 is provided where the floating shaft 31 passes through the front end plate 21, the grease seal preferably being attached to the front end plate 21. This grease seal prevents oil and grease leaving the gear case along the floating shaft 31. The shaft 31 is provided with means, such as the shoulders shown as seating against the spacer 34 and bearing 33, retaining the shaft 31 against substantial endwise movement in normal operation.

On the floating shaft 31, I provide the sun gear 36, which is attached to the floating shaft 31 by any convenient means, such as the spline 37, and revolves with the floating shaft 31. The driven first spur gear 28, has an integral portion performing the function of a planet carrier, and which carries the pinion shafts 38, on which the pinion gears 39 are journaled, it being preferable to have at least three pinion gears 39, in the arrangement provided.

Meshing with the planet pinions 39, I provide the ring or internal gear 40, (hereinafter usually called "internal gear"), and attached planet pinion gear carrier 41, which planet pinion gear carrier 41 is attached to the internal gear 40 by any convenient means such as the rivets 42.

On the planet pinion carrier 41 I have placed the spur gear 43 (hereinafter usually referred to as "second spur gear"), which is preferably splined to said planet pinion carrier 41. The assembly of ring gear 40, planet pinion carrier 41 and second spur gear 43, are maintained in place and are supported on the floating shaft 31, by any convenient means, such as the bearings 44 and 45, whereby said assembled parts may rotate independently with respect to the rotation of said shaft 31.

The floating shaft 31, has, preferably as an integral part thereof, the sun gear 46. The planet pinion carrier 41 carries the planet pinion shafts 47, on which revolve the planet pinion gears 48, meshing with the sun gear 46 and hereinafter described ring gear 49. Preferably, for the construction illustrated here, there are at least three of the planet pinion gears 48.

Meshing with the planet pinion gears 48, is the ring gear 49, which is preferably made integral with the output shaft, and journaled within the bearings 50, and 51. The grease seal 52 is provided, and is shown as attached to the rear end plate 22. Said grease seal 52 surrounds the output shaft of the ring gear 49, and prevents grease and oil leaving the transmission along the output shaft. By the regulation of the flow of fluid through the primary and secondary hydraulic governors, reduction of speed may be obtained so that the combination of the elements, ring gear 40, planet carrier 41 and planet gears 48 which are restricted in speed by the gears 43 and 53 and shaft 55, by the secondary hydraulic governor 69, thus enforcing slower speed on the ring gear 40, which results in driving the sun gear 36 (through the planet pinion gears 39) at a speed greater than the spur gear 28 and thus through the shaft 31 and sun gear 46, creates counter torque or resistance in the planet pinion gears 48, which will in turn, resist the counter torque in ring gear 49.

By the regulation of the flow of fluid through the hydraulic governors a point may be established in the compound differential speeds in the two planetary gear sets wherein a zero R. P. M. speed on the output ring gear 49 may be maintained while the input power shaft 23 is rotating, to hold the vehicle in a state of practical immobility whether in level position or on a grade.

The third spur gear 53 is drivingly connected by the spline 54, or otherwise to the shaft (sometimes hereinafter called secondary hydraulic governor shaft) 55 which is journaled in the bearings 56 and 57 for rotation therein. The gear 53 is held in position against longitudinal movement on the spline 54 in a direction toward the "rear" end of the transmission by means of the sleeve 58, and held against longitudinal movement forward by a shoulder on the shaft 55. The grease seal 59 surrounds the shaft 55 and is preferably attached to the front end plate 21.

The housing casing 60, which fits on the front end plate 21 of the transmission housing or gear case 20, contains the primary and secondary hydraulic governors 64 and 69 respectively. The housing casing 60 is attached to the front end plate 21 of the gear case 20 in any convenient manner.

The cover plate 61 is provided for the housing casing 60 and is attached to the housing casing 60 and forms a part thereof, by any suitable means such as bolts or the like (not shown).

The oil seal adjusting nut 62, and the oil seal assembly 63, provides against the escape of fluid under pressure from the primary hydraulic governor 64, which primary hydraulic governor is splined to the floating shaft 31 and rotates therewith. The primary hydraulic governor 64 contains what may be designated as the piston 65, which in turn is provided with the sliding bearing block 66 on the stationary bearing pin 67. The pin 67 is preferably made integral with or attached to the cover plate 61. A by-pass port 68 is provided in the housing casing 60 for passage of fluid in the manner and for the purposes hereinafter explained. The secondary hydraulic governor 69 is splined to and driven by the secondary hydraulic governor shaft 55, and contains the secondary hydraulic governor piston 70, which is provided with the sliding bearing block 71 on the stationary piston pin 72, which piston pin 72 is preferably integral with, or attached to the cover plate 61, as was the case with respect to the bearing pin 67.

The grease seal adjusting nut 73 maintains the grease seal assembly 74 which prevents the fluid under pressure in the secondary hydraulic governor 69 from leaving said secondary hydraulic governor.

The hydraulic governors will be described more in detail hereafter.

The operation of the device as shown in Figure 1 is as follows:

The input shaft 23 and its driving pinion or gear 24 drive the first spur gear 28, to which is attached the pinion gears 39. With torque resistance on the internal gear 40 holding the rotation of said internal gear 40 to any speed less than that of the gear 28, the sun gear 36 is caused to revolve at a speed greater than the spur gear 28. The sun gear 36 will thus drive the floating shaft 31, which in turn will drive both the sun gear 46 and the primary hydraulic governor 64.

The internal gear 40 may be held to a lesser speed than the spur gear 28 by means of the second spur gear 43 and the third spur gear 53, secondary hydraulic governor shaft 55, and secondary hydraulic governor 69, through the medium of a reduced flow of fluid (as hereinafter explained) through the secondary hydraulic governor 69.

Also, the internal gear 40 may be stopped or reduced in speed by torque resistance through the planet pinions 48 and output ring gear 49, the latter being connected to the device to be driven, such as the axle of the vehicle. Inversely, by restriction or resistance to the flow of fluid by the primary hydraulic governor 64 which is splined to the shaft 31, the said shaft 31, will in turn hold the sun gears 36 and 46, which through the planet pinion gears 39 will cause the internal gear 40 to rotate at a speed greater than the first spur gear 28. The said internal gear 40 drives the planet pinion gear carrier 41, and through the planet pinion gears 48 because the sun gear 46 is held against rotation, drives output ring gear 49 at a speed greater than the speed of the internal gear 40, and the planet pinion carrier 41.

Controlling these compound differentials of speed on the principles above described, will produce desired conditions ranging from neutral or no output on the ring gear and integral output shaft 49 through the range of speeds to a direct speed wherein the above described elements would be rotated at respective speeds to produce an over-drive output speed, that, in the drawings shown herein, should approximate a speed of rotation on the ring gear and integral output shaft 49 of double the speed of the first spur gear 28. In reverse direction, the maximum speed in reverse would be obtained by a complete restriction of the passage of fluid through the secondary hydraulic governor 69 (as hereinafter described), which secondary hydraulic governor 69 is splined to the shaft 55 and holds, when the fluid passage is completely restricted, the shaft 55, second and third spur gears 43 and 53, internal gear 40, and planet pinion gear carrier 41, stationary. As the first spur gear 28 is rotated carrying the planet pinion gears 39 around the internal gear 40, the sun gear 36 is driven at a speed considerably in excess of that of the first spur gear 28. With the internal gear 40 and planet pinion gear carrier 41 held stationary, as previously described, the planet pinion gears 48 will be rotated on their own centers by the sun gear 46 as the floating shaft 31 will be rotated by sun gear 36, and thus apply power to the sun gear 46. Thus the planet pinion gears 48 will be caused to rotate on their own centers and drive the output ring gear 49 in a reversed direction.

In the approximate proportions shown in the drawings, the maximum speed in reverse of the output ring gear 49 will approximate 1.4 times the speed of the first spur gear 28.

At either forward or reverse directions, by controlling the operation of the hydraulic governors, the range of speed may be varied infinitely from zero to maximum on the output shaft.

In the above described operations, the functions have been illustrated as transmitting torque from the input shaft 23 to the output ring gear 49 in either direction. In the case of counter-torque on the output ring gear 49, where the vehicle is being held in either an ascending or descending position on grades, or, where the vehicle is being reduced or restricted in speed of movement as compared to the speed of the input shaft 23, such as when descending forward or backing downward on grades, the same natural functions of the various elements above described will control the transmission, the operator having only to regulate the flow of fluid through the primary and secondary hydraulic governors, and thus control the correlative action of the planetary gear sets.

For example, if the vehicle were being restricted or reduced in speed in descending a grade, there would be counter-torque applied through the wheels of the vehicle to the ring gear and shaft 49, thus applying power or over-hauling load through the planet pinion gear 48, planet carrier 41, internal gear 40, sun gear 46, floating shaft 31 and sun gear 36, which elements would exert counter-torque on the first spur gear 28.

*Description of Figure 2*

In Figure 2, I have provided a modified arrangement of the planetary gear system. It comprises two planetary gear sets in an arrangement somewhat different from that shown in Figure 1. The spur gear 28 is integral with the planet pinion gear carrier, and as such supports the planet gears. The planet pinion gear shafts 38 are journaled to the spur gear 28, and carry the planet pinion gears 39. The integral extended tubular section 179 is attached to the planet pinion gear shafts 38, and rotates with the spur gear 28. The planet pinion gears 39 are thus supported on both sides, one side by the spur gear 28 which acts as a planet pinion gear carrier and on the other side by the extended tubular section 179. The spur gear 28 is journaled on a bearing 76, and said bearing 76 is carried by a floating shaft 78 which corresponds somewhat to the floating shaft 31 of Figure 1. The extended tubular section 179 is seated in a second sun gear 90 and splined thereto by a spline 91. The second sun gear 90 is in turn supported on the floating shaft 78 by the sun gear hub journal bearing 92, which journal bearing 92 supports one side of the second sun gear 90, and thereby also supports one end of the extended tubular section 179 in a manner making said extended tubular section 179 entirely independent in rotation from the floating shaft 78.

The sun gear 36 is keyed or splined to the floating shaft 78 and rotates therewith. It forms the shoulder for the journal bearing 76, and the floating shaft 78 has a shoulder portion provided to hold the sun gear 36 against longitudinal movement on the shaft 78. The sun gear 36 meshes with the planet pinion gears 39.

I have provided the ring or internal gear 40 similar to the gear 40 of Figure 1, which ring gear 40 has an extension 41 comprising a planet gear carrier 41 for the second planet pinions 48. These second planet pinions 48 are journaled on planet gear shafts 47 in the manner of Figure 1. The planet pinion gear carrier likewise is provided with a second spur gear 43, corresponding to the second spur gear 43 of Figure 1. The output ring gear 49 with its integral output shaft, meshes with the second planet gears 48, as in Figure 1.

The spacer ring 80 is shown separating the bearings 79 and 92.

Operation of Figure 2

In Figure 2, the operation is in general similar to Figure 1, with the notable difference that the second sun gear 46 of Figure 1 has been replaced by the second sun gear 90, which (unlike the second sun gear 46 of Figure 1 which is attached to the floating shaft 31) is seated on and attached to the extended tubular section 179. The extended tubular section 179 has no counterpart in Figure 1, and it is driven by the planet pinion gears 39. It will thus be seen that the second sun gear 90, of Figure 2, is operated in unison with the planet pinion gears 39, which in turn are carried around the floating shaft at the speed of the first spur gear 28 (driven by the input shaft driving pinion 24). Thus the second sun gear is carried around the floating shaft 78, at the speed of the first spur gear 28. In Figure 1, the second sun gear 46 rotates entirely with the floating shaft 31, while in Figure 2, the comparable second sun gear 90 is "totally" independent of the rotations of the floating shaft 78.

In Figure 2, the remaining elements are operated in a generally similar way, the control of the floating shaft 78 by means of the primary hydraulic governor, controlling the sun gear 36 and thus the action of the sun gear 36 on the planet pinion gears 39; and the control of the second spur gear 43, (which meshes with the third spur gear 53) the internal gear 40, the planetary pinion carrier 41, and thus the rotation around the extended tubular section 179 and floating shaft 78 of the second pinion gears 48. The different result accomplished is that the maximum speeds may be changed, and with the approximate proportions shown in Figures 1 and 2, the maximum forward speed of the output ring gear 49 of Figure 2 is approximately 1.6 times the speed of the first spur gear 28, while in Figure 1, it is approximately twice the speed of the spur gear 28. Similarly, in reverse the arrangement of Figure 2 may be operated at only approximately an output speed on the ring gear 49 of 1.4 times the speed of the spur gear 28, while in Figure 1, the maximum reverse output speed of the ring gear 49, in the proportions shown, is 1.4 times that of the first spur gear 28.

Description of Figure 3

The arrangement of the gears as shown in Figure 3 is intended to provide a modification of the previously described gear sets, in that it contains a beveled gear differential set instead of the second planetary set as shown in Figure 1 or Figure 2.

In Figure 3 the spur gear 96 corresponds to the first spur gear 28 in Figures 1 and 2 and is splined at 97 to the planet gear carrier 102, and is journaled on the bearing 98, which in turn is supported on the floating shaft 99 which corresponds to floating shaft 31. The said shaft 99 has the sun gear 100 integral with it, and is journaled in the bearing 101. The bearing support for the opposite end of shaft 99 is not shown but is similar to bearing 32 in Figure 1. Drivingly attached to the gear 96 by the spline 97 is the planet gear carrier 102 integral with the beveled gear 103 and journaled in the bearing 104. Planet pinion carrier 102 supports the planet pinion shafts 38 on which revolve the first planet pinion gears 39 which mesh with internal teeth of a ring gear integral with the differential housing 107.

Also integral with the ring gear housing 107 is the external gear 108, which corresponds to second spur gear 43 in function and operation, said ring gear housing being journaled on bearings 109 and 119. A spacer or the like, 111 is provided to maintain the position of the bearing 109. The floating shaft 99 carries a shaft holder 112 which is not attached to the floating shaft 99, which carrier in turn supports the pinion shafts 113 and 114 on which revolve the pinions 115 of which there are to be preferably two or more in number. The said pinions 115 mesh with the output bevel gear 116 which is integral with output shaft 117, the inner end of the said output shaft 117 being journaled in bearing 118, supported by the rear end plate 22, a fragmentary section of which is shown. The bevel gear 116 and integral output shaft 117 correspond in function to ring gear and integral output shaft 49 of Figure 1. The bearing support for the outer end of the output shaft 117 is not shown. The driving and driven connections and the connections to the hydraulic governors are substantially the same as in Figures 1 and 2.

Operation of Figure 3

In general principle, the construction shown in Figure 3, is similar to Figure 2 in operation. The arrangement is somewhat different however, the planet gear carrier 102 being splined, in the construction shown, to the spur gear 96, whereas in Figure 1 the planet gear carrier is integral with the first spur gear 28. The first planet pinion gears 39 are the same in both figures, but the internal gear 40 has been replaced in Figure 3 by the internally geared differential housing 107. Instead of the second planetary gears, I have provided the differential gears which comprise the bevel gear 103 (corresponding in function to the sun gear 90 of Figure 2), the pinion shaft 113 and 114 carried by the internally geared differential housing 107 and shaft holder 112 (corresponding in function to the planet gear shaft 47), beveled pinion 115 (corresponding to second planet pinion 48, in function), and bevelled gear 116 and output shaft 117 corresponding in function to ring gear and integral output shaft 49 of Figures 1 and 2. The external gear 108 corresponds in function to second spur gear 43. The operation is similar to that of Figure 2 in principle, with the corresponding parts functioning as in Figure 2.

In the arrangements of the gear sets in Figure 3 the maximum forward speed of the output shaft will approximate 1.8 times that of the speed of the spur gear 96. The maximum speed of the output shaft in reverse direction will approximate the same speed as the spur gear 96.

Description of Figure 4

Figure 4 shows a preferred embodiment of the arrangement of the primary and secondary hydraulic governors. Taken on the line AA in Figure 1, wherein the case 60 is shown containing the primary hydraulic governor rotor 64, piston 65, bearing block 66, and an eccentrically placed bearing pin 67. The piston 65 is shown in mid-stroke with the bearing at bottom of the bearing sliding section of the piston 65.

The secondary hydraulic governor is shown also contained in the case 60 with the secondary hydraulic governor rotor 69, sliding piston 70, bearing block 71 and an eccentrically placed bearing pin 72. The piston 70 is shown at bottom of its stroke and the valve 136 is shown in position to permit the maximum passage of fluid thru the two governors as will be evident on examination of the direction of flow indicated by arrows. The by-pass port 68 is shown as closed by the valve 136. The primary hydraulic governor rotor 64 is shown in a position receiving fluid thru port 120 and discharging said fluid from port 121. Fluid thus flowing thru the valve 136 will enter port 122 and be discharged by the action of the secondary hydraulic governor rotor 69 thru port 123.

Description of the remaining figures

The primary and secondary governors are contained in a case 60 which is part of the housing casing 60, described in Figure 4. Within the case 60, the rotor 64 is generally provided with the piston 65 which slides against the face planes of the rotor 64. The stationary bearing pin 67 is provided, which pin 67 is usually journaled in the housing casing 60. A sliding bearing block 66 is carried by the pin 67. The pin 67 is usually off center and as the hydraulic governor rotates, the bearing block 66 will be forced from side to side, performing a pumping type movement. The sliding bearing block 66 likewise will be forced from side to side in an opposite plane as more clearly shown in Figure 4.

The housing casing 60 of Figure 5 as provided with the port 120 through which the fluid from the reservoir enters the housing casing in the space allowed by the piston 65.

Figure 6 shows a modified arrangement of the primary and secondary hydraulic governors with the case 60 containing the primary hydraulic governor rotor 137, pistons 138, connecting rods 139 and eccentrically placed shaft 140.

The case also contains the secondary hydraulic governor rotor 141, the pistons 142, the connecting rods 143 and the eccentrically placed shaft 144. The valve 136 is the same as shown in Figure 4 and is in the same position to permit the maximum amount of fluid flowing in circuit thru the primary and secondary hydraulic governors.

Figure 7 is a perspective view of the primary hydraulic governor in Figure 6 and shows the nature and shape of the rotor and pistons. A similar view of the secondary hydraulic governor would be the same as in Figure 7.

Figures 8, 9, 10 and 11 show a fragmentary part of that section of the case 60 which contains the valve 136. In Figure 8 the valve is shown in position to receive from the port 121 shown in Figure 4 and return thru the by-pass port 68 to the intake in the primary hydraulic governor. The flow to port 122 shown in Figure 4, is shown completely cut off, therefore the valve as shown in the position in Figure 8 would permit the primary hydraulic governor 64 to revolve freely while the secondary hydraulic governor 69 is held stationary. In such a case the transmission would be functioning to provide the maximum speed in reverse.

In Figure 9 the valve 136 is shown in position to restrict somewhat the return flow of fluid to the primary hydraulic governor and to permit a partial flow to the secondary hydraulic governor. In this case the primary hydraulic governor will be rotating at a speed considerably in excess of that of the secondary hydraulic governor and would be approaching a point somewhere near the neutral or stationary position of the output ring gear and shaft.

In Figure 10 the valve 136 is shown restricting the flow of fluid from the primary hydraulic governor to permit rotation of the secondary hydraulic governor at a speed greater than that of the primary hydraulic governor. In this case a part of the fluid is permitted to return from the secondary hydraulic governor thru the by-pass port 68 while the remaining quantity of fluid is permitted to enter the primary hydraulic governor. In this case the output speed of the ring gear 49 would be approaching the speed of the gear 28 in Figure 1. Or in other words, the speed corresponding to direct drive in an automobile.

In Figure 11 the valve 136 is shown in position to receive the full discharge of the secondary hydraulic governor thru the by-pass port 68 and return the full quantity of fluid to the secondary hydraulic governor. In this case the maximum forward output speed of the ring gear 49 would be provided.

In Figure 12 is shown, in section, a modified arrangement of the primary and secondary hydraulic governors in a rotary vane form, wherein the case 125 would correspond to the case 60 shown in Figure 4, and contain the primary hydraulic governor rotor 126, pistons 127, and piston springs 128, and the secondary hydraulic governor rotor 129, the pistons 130, and piston springs 131. The entrance and discharge ports for both governors would be similar to ports 120, 121, 122 and 123 in Figures 4 and 6. The valve 136 is likewise shown in the same position as in Figures 4 and 6, a point of operation wherein both governors are permitted to rotate at maximum speeds.

Shown in Figures 13 and 14 is a fragmentary part of that section of the case 125 containing valve 136. In Figure 13 the valve is shown in a position permitting full operation of the primary hydraulic governor while holding the secondary hydraulic governor stationary. In this case, the maximum reverse speed on the ring gear 49, would be provided (see Figure 1).

Figure 14 shows the valve 136 in position to permit the full operation of the secondary hydraulic governor while holding the primary hydraulic governor stationary. In this case the maximum forward speed on the ring gear 49 (see Figure 1) would be provided.

Figure 15 shows an arrangement of two transmissions coupled to a single driving source.

This arrangement is especially adaptable to the driving of caterpillar tractors or vehicles, for agricultural, industrial or military uses. The two transmissions units are shown opposite to each other and in a view of the exterior of the cases 20, rear end plates 21, hydraulic governor cases 60 and cover plates 61. Grease seal adjusting nuts 62 and 72 with floating shafts 31 (connected to the primary hydraulic governors), and secondary hydraulic shafts 55 are shown.

In partial section is shown connecting case 145, power input shaft 146, fragmentary part of coupling 147, grease seal 148, journaled in bearings 149 and 150. A mitre driving gear is shown integral with shaft 146 and meshing with mitre gear 151 integral with driven shaft journaled in bearings 152 and 153.

A section of flexible coupling is shown on spline 154, said coupling parts being denoted as 155, 156 and 157. On the opposite end of mitre gear shaft 151 is shown a partial view of coupling 158. Both couplings on shaft 151 connect to the input shafts of the transmission units corresponding to shafts 23, Figure 1. Gears 178 are shown attached to the output shafts of the two transmission units.

Base casting 160 is shown connecting the two transmission units and supporting bearings 161, supporting shaft 162 (shown in Figures 16 and 17) on which is mounted the frame 163 supporting gear shafts 164 and 165, on which the integral spur and mitre gears 166 and 167 rotate and mesh with mitre gears 176 and 177 attached to valves 136. Figure 15 shows the control shaft 170 and the lever arm 171 integral with universal joint 172, 173 and rod 174.

Figure 16 shows in section, a fragmentary section of the base casting 160, bearings 161 and shaft 162. The frame 163 is shown vertically in the forward control position with dotted outlines showing approximate positions of neutral, and position for maximum reverse speed. Figure 16 shows the geared rack 168 which is meshed with gears 166 and 167, the pin 169, the shaft 170 and arm 171 which is integral with universal joint part 172, connected to universal part 173.

The rod 174 partially shown, is for use in control in a remote position. The dotted outline of the hand lever 175 is an alternate method of controlling the device at a near point.

Figure 17 shows an arrangement of the control device in elevational view with frame 163 supporting shafts 164 and 165 to which are attached gears 166 and 167 meshing with gears 176 and 177 attached to valves 136.

Figure 18 shows an arrangement of the shaft 170 and lever arm 171 acting on the pin 169 attached to geared rack 168 and shows the movement of the said geared rack in acting on the spur gear portions of gears 166 and 167.

*Operation*

As shown in Figures 15, 16, 17 and 18, the input drive shaft 146 meshing with cross drive shaft 151 will drive input shafts of both transmission units. The control of the two transmission units will be effected in the following manner:

By a forward or backward movement of the control rod 174 without rotating the said control rod 174 or by a forward or backward movement of the hand lever 175 without moving the said hand lever either to right or left the frame 163 will be moved in an arc around the axis of shaft 162. In a forward or backward movement only of the control rod 174 or the hand lever 175, which lever would otherwise be attached to lever arm 171, the said lever arm 171 would not be permitted to swing in an arc around the axis of the shaft 170. Therefore, the said lever arm 171 thru the pin 169 would hold the geared rack 168 in a fixed position, locking the gears 166 and 167 in a fixed position, but as the frame 163 is moved in an arc around the axis of the shaft 162 the mitre gears 176 and 177 are rotated simultaneously in the same direction as the arc of movement of the frame 163.

This action will result in the control valves for the hydraulic governors of both transmission units to be simultaneously moved either from a neutral position to a maxim forward position or from a neutral position to a maximum reverse position.

The above described operations of the control device will cover the simultaneous forward or backward movement of both transmission units.

However, as the operation of a caterpillar vehicle will require various turning movements, which also in sharp maneuverability, will require the vehicle being substantially pivoted on its own vertical axis by the forward movement of one tread while the other tread is being reversed, the second principle of control is combined with that first described, wherein by the rotation of the control rod 174 or the side to side movement of the hand lever 175, will swing the lever arm 171 in an arc around the axis of shaft 170 to move the geared rack 168 from side to side thus rotating the gears 166 and 167. This movement of the geared rack 168 will cause the gear 176 to rotate in a direction opposite to gear 177, thus moving one of the hydraulic control valves for forward movement while moving the other hydraulic control valve for a reverse movement.

It will be evident upon examination of the Figures 15, 16, 17 and 18 that it is possible to move the controls forward or backward while simultaneously imparting a rotating movement of control rod 174 or a side to side movement of hand lever 175, thus accomplishing any degree of right or left turn, forward or reverse or of pivoting the vehicle right or left on its own vertical axis.

The control devices as above described have been arranged in a universal principle of action to permit the operator to obtain all the required functions of movement by use of one hand. In the inherent nature of this general arrangement it is possible to perform all the functions of control without regard to the speed of the prime mover up to the limits of safety and movement of the vehicle.

The arrangement of two transmission units also retains all the functions of a single unit in that it will maintain a neutral position against movement while prime mover is in operation or to function in resistance against counter torque as previously described.

The universal one hand control has chiefly as its purpose, a great simplicity in operation and a provision for the operator having a free hand to operate the various appurtenances which caterpillar vehicles generally carry and operate, or in the case of military use, to permit a single operator to perform other duties simultaneously with the operation of the vehicle.

This is a decided improvement over present methods where multiplicity of controls are necessary to secure all the functions of movement required in the operation of a caterpillar vehicle.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. A device of the class described, comprising in combination an input shaft, a floating shaft, gear means on the input shaft, gear means journaled on the floating shaft and rotating independently thereof, said last mentioned gear means being driven by the input shaft gear means, sun gear means carried by the floating shaft above mentioned, planetary gears driven around said floating shaft by the first mentioned floating shaft gear means, said planet gear means meshing with said sun gear of said floating shaft, means operative at the will of the operator to retard or prevent rotation of the floating shaft, thereby stopping the sun gear carried thereon, a ring gear meshing with said planet gear, said ring gear driving a second planet gear means around said floating shaft, a second sun gear attached to said floating shaft and engaging said second planet gear means, a ring gear and output shaft driven by said second planet gear means, a secondary hydraulic governor shaft, gear means on the secondary hydraulic governor shaft meshing with the driving means for said secondary planet gear means above mentioned, means retarding rotation of the floating shaft and secondary hydraulic governor shaft, the arrangement being such that variation of the speeds of the floating shaft and the hydraulic governor shaft, the speed of the input shaft remaining the same, will vary the speed, and even the direction, of rotation, of the output shaft.

2. A device of the class described, comprising in combination, an input shaft from a source of power, a floating shaft, means operative for retarding the rotation of the floating shaft, a first spur gear journaled on the floating shaft and driven by the input shaft, planetary gear means driven through said first spur gear and rotating about the floating shaft, a first sun gear driven with said floating shaft and meshing with said planetary pinion gear means, an internal gear meshing with said first planetary gear means and having a planet pinion carrier, a secondary gear means carried by said planet pinion carrier, internal gear retarding means, a second sun gear on said floating shaft and meshing with said secondary gear means, a secondary hydraulic governor shaft, gear means comprising a third spur gear on said secondary hydraulic governor shaft, meshing with said retarding means on the internal gear, a ring gear meshing with said secondary gear means, and means comprising a secondary hydraulic governor retarding rotation of the secondary hydraulic governor shaft, in selected amounts under control of an operator.

3. A device of the class described, comprising in combination, a gear case with removable access portions, an input shaft from a source of power journaled in said gear case, a floating shaft, hydraulic governor means operative for retarding the rotation of the floating shaft under the control of the operator, a first spur gear independently journaled on the floating shaft and driven by the input shaft, gear means comprising a least one planetary pinion carried by said first spur gear and rotating therewith about the floating shaft, a first sun gear driven with said floating shaft and meshing with said planetary pinion gear means, an internal gear meshing with said first planet gear means and having an integral planet pinion carrier, a secondary gear means comprising at least one second planet pinion gear carried by said planet pinion carrier, internal gear retarding means, comprising a second spur gear carried by the internal gear, a second sun gear on said floating shaft and meshing with said secondary gear means, a secondary hydraulic governor shaft, gear means comprising a third spur gear on said secondary hydraulic governor shaft, operating said retarding means on the internal gear, a ring gear meshing with said secondary gear means, and means comprising a secondary hydraulic governor retarding rotation of the secondary hydraulic governor shaft, in selected amounts under control of an operator.

4. The device of the class described, comprising in combination an input shaft from a source of power, a floating shaft, means operative for retarding the rotation of the floating shaft, planet gear means on the floating shaft driven by a gear chain actuated by the input shaft, a sun gear meshing with said planet gear means, said sun gear being integral with the floating shaft, an internal gear driven by said planet gear means, a secondary planet gear set driven by said internal gear, a second sun gear on said floating shaft and meshing with said second planet gear means, an output ring gear meshing with said second planet gear set and being operatively controlled by the movement of said second planetary gear set, and means operative for retarding movement of the internal gear and second planet gear set driven thereby, about the floating shaft, said floating shaft and the means operative to retard the internal gear being controlled by hydraulic means operative at variable degrees of retardation for independently retarding the floating shaft and the internal gear.

5. A planetary gear arrangement for a transmission and the like comprising a sun gear, planetary gears meshing with said sun gear, means carrying and driving said planetary gears, a ring gear meshing with said planetary gears and carrying a second set of planetary gears, an output ring gear meshing with said second planetary gears, a second sun gear meshing with said second planetary gears, and means operative for selectively retarding the second planetary gear set.

6. The planetary gear arrangement for a transmission and the like, comprising a floating shaft, a first spur gear carried for rotation about said floating shaft, planetary pinion gears driven by said first spur gear and rotating about said floating shaft, a sun gear attached to said floating shaft meshing with said planet pinion gears, an extended tubular section driven by said planet pinion gears and rotating about said floating shaft, a sun gear attached to said extended tubular section and driven therewith, an internal gear meshing with said planet pinion gear and journaled for rotation about said extended tubular section, a spur gear carried by said internal gear and rotating therewith, a second planet pinion gear set driven by said internal gear and meshing with said second sun gear, and a ring gear and integral output shaft meshing with said second planet pinion gear shaft.

7. In combination, a planet pinion gear set and a differential bevel gear set, for transmissions or the like, comprising a floating shaft, a first spur gear journaled for rotation about said floating shaft, a planet gear carrier driven by said first spur gear and rotating about said floating shaft, planet gears driven by said planet gear carrier, a sun gear on said floating shaft, a differential housing having internal gear means meshing with said planet pinion gears, an external gear on said differential housing, a bevel gear driven by said planet gear carrier, at least one pinion shaft journaled in said differential housing, beveled pinion means carried by said pinion shaft and meshing with said bevel gear, said pinion shaft and bevel pinion means being adapted for rotation about the floating shaft independently thereof, and a second bevel gear meshing with said bevel pinion, said second bevel gear being journaled for rotation about said floating shaft, and having an integral output shaft.

8. A hydraulic governor arrangement for a transmission or the like, of the class described, comprising a case containing fluid, a primary hydraulic governor having a shell and a rotor eccentrically journaled for rotation within the shell, inlet means for fluid entering said primary hydraulic governor, discharge means for fluid, leaving said hydraulic governor, a valve means operable to control the amount of fluid passing through said primary hydraulic governor, a secondary hydraulic governor separated from said primary hydraulic governor, said secondary hydraulic governor having a shell and an eccentrically disposed rotor in said shell, inlet and discharge ports for fluid passing through said secondary hydraulic governor and a bypass whereby fluid may be bypassed at either or both of said hydraulic governors, the discharge of the primary hydraulic governor, the inlet of the secondary hydraulic governor, and the bypass being under the control of the valve which, in turn, is under the control of the operator.

9. In a device of the class described, a plurality of transmissions, connected to a source of input power with each transmission having an input shaft and an output shaft and an hydraulic control means regulated by an adjustable valve means whereby the adjustment of the valve determines the revolutions per minute of the output shaft in forward and reverse, as the case may be, with respect to the input shaft revolutions, the valve of one unit being oppositely mounted with respect to the valve of another unit, and manually operable means variable at the will of the operator, for simultaneously and individually controlling the said valve means, and thereby the output shaft of each of said transmission means said manually operable means including a gear attached to each of said valves, another gear meshing with the gear attached to each valve, gear supporting shafts supporting said second mentioned gears, a frame supporting shaft, a frame mounted for rotative movement about said frame supporting shaft, said frame having said gear supporting shafts journaled thereon, a geared rack slidably mounted in said frame and meshing with said second mentioned gear, means under control of the operator moving said geared rack in its mounting, thereby rotating said second mentioned gears and, since the valves of said transmissions are oppositely mounted, moving said valves in opposite directions, and means for effecting movement of said frame about its supporting shaft causing a responsive movement of both valves in the same direction.

10. In a device of the class described, a plurality of transmissions, connected to a source of input power with each transmission having an input shaft and an output shaft and an hydraulic control means regulated by an adjustable valve means whereby the adjustment of the valve determines the revolutions per minute of the output shaft in forward and reverse, as the case may be, with respect to the input shaft revolutions, the valve of one unit being oppositely mounted with respect to the valve of another unit, and manually operable means under the control of a single lever variable at the will of the operator, for simultaneously and individually controlling the said valve means, and thereby the output shaft of each of said transmission means said manually operable means including a gear attached to each of said valves, another gear meshing with the gear attached to each valve, gear supporting shafts supporting said second mentioned gear a frame supporting shaft, a frame mounted for rotative movement about said frame supporting shaft, said frame having said gear supporting shafts journaled thereon, a geared rack slidably mounted in said frame and meshing with said second mentioned gear, means under control of the operator moving said geared rack in its mounting, thereby rotating said second mentioned gears and, since the valves of said transmissions are oppositely mounted, moving said valves in opposite directions, and means connecting the lever with the frame for effecting movement of the frame about its supporting shaft to thereby cause a responsive movement of both valves in the same direction.

11. A device of the class described, comprising a combination of the gear case with removable access portions, an input shaft adapted for connection to a source of power and having a driving pinion within the gear case, said input shaft being journaled on bearing means for rotation within the gear case, a floating shaft journaled for rotation within said gear case, a second hydraulic governor shaft likewise journaled for rotation within said gear case, all of said shafts having bearing means, a first spur gear journaled for rotation on said floating shaft, and having bearing means, said first spur gear likewise having an integral planet pinion carrier, a plurality of planet pinion gears carried by said planet pinion carrier and adapted for rotation around said floating shaft, a sun gear carried by said floating shaft and attached thereto, said sun gear meshing with said planet pinion gears, an internal gear meshing with said planet pinion gears and journaled for rotation about said floating shaft, a second planet pinion gear carrier attached to said internal gear, a second spur gear attached to said second planet gear carrier, a plurality of second planet pinion gears carried by said second planet pinion gear carrier and adapted for rotation about the floating shaft, a second sun gear on said floating shaft meshing with said planet pinion gears, a ring gear and integral output shaft meshing with said planet pinion gears, and journaled for rotation in said gear case, a third spur gear attached to said secondary hydraulic governor shaft and meshing with said second spur gear, a primary hydraulic governor attached to said floating shaft, a secondary hydraulic governor shaft, a case containing said hydraulic governors, port means between said hydraulic governors whereby fluid is passed therebetween, a bypass between said hydraulic governors whereby all or part of the fluid from the primary hydraulic governor may be bypassed before reaching the secondary hydraulic governor, and whereby all or part of the fluid from the secondary hydraulic governor may be bypassed before reaching the primary governor, and valve means under the control of the operator regulating the flow of fluid in said hydraulic governors, the arrangement being such that the primary hydraulic governor may be operated at any speed, regardless of the speed of the secondary hydraulic governor, by valve means regulating the supply of fluid therefrom, and the secondary hydraulic governor may be operated at any speed, regardless of the speed of the primary hydraulic governor, by the said valve means regulating the supply of fluid thereto, and either hydraulic governor may be independently held against rotation, the rotation of the hydraulic governors being imparted to or from their respective shafts, that is, the primary hydraulic governor rotation being imparted to or from the floating shaft and the secondary hydraulic governor rotation being imparted to or from the secondary hydraulic governor shaft, at the will of the operator.

12. A hydraulic governor means for a device of the class described comprising in combination a casing having fluid therein, primary and secondary hydraulic governor rotors located within said casing, a double acting sliding piston within each hydraulic governor rotor, a block bearing slot within each piston, a block bearing and bearing pin in each hydraulic governor, fixed eccentrically in said casing, adapted to slide within said pistons, inlet and outlet ports for said hydraulic governors, valve means located in the fluid passage between the hydraulic governors and regulating the fluid passed through each hydraulic governor, and bypass means between said hydraulic governors and interconnected with said valve means whereby each governor may be operated independently of the other at the will of the operator.

13. A hydraulic governor means for a device of the class described comprising in combination a casing having fluid therein, primary and secondary hydraulic governor rotors located within said casing, sliding pistons within each of said hydraulic governor rotors, connected to stationary pins eccentrically fixed to said casing, inlet and outlet ports for said hydraulic governors, valve means located in the fluid passage between the hydraulic governors and regulating the fluid passed through each hydraulic governor, and bypass means between said hydraulic governors and interconnected with said valve means whereby each governor may be operated independently of the other at the will of the operator.

14. A transmission unit comprising in combination a power input shaft, a first differential gear set, means connecting one element of the differential gear set to said shaft, a primary hydraulic governor connected to a second element of the first differential gear set, a secondary hydraulic governor connected to the third element of said first differential gear set, a second differential gear set, means connecting one element of said second differential gear set to the primary hydraulic governor, means connecting a second element of said second differential gear set to the secondary hydraulic governor, a power output shaft connected to the third element of said second differential gear set, fluid circuits for the governors, and control valve means in said circuits operable selectively to control the speed of each governor.

15. A transmission unit comprising in combination a power input shaft, a first differential gear set, means connecting one element of the differential gear set to said shaft, a primary hydraulic governor connected to a second element of the first differential gear set, a secondary hydraulic governor connected to the third element of said first differential gear set, a second differential gear set, means connecting one element of said second differential gear set to the primary hydraulic governor, means connecting a second element of said second differential gear set to the third element of said first differential gear set, a power output shaft connected to the third element of said second differential gear set, fluid circuits for the governors and control valve means in said circuits operable selectively to control the speed of each governor.

16. A transmission unit comprising in combination a power input shaft, a first differential gear set, means connecting one element of the differential gear set to said shaft, a primary hydraulic governor connected to a second element of the first differential gear set, a secondary hydraulic governor connected to the third element of said first differential gear set, a second differential gear set, means connecting one element of said second differential gear set to the primary hydraulic governor, means connecting a second element of said second differential gear set to the secondary hydraulic governor, a power output shaft connected to the third element of said second differential gear set, a closed fluid circuit for said governors connecting the output of each governor with the input of the other, a by-pass in said circuit between the governors, and valve means operable to proportion the flow of fluid between the governors and the by-pass.

FRANK D. CAMPBELL.